US008854170B2

(12) United States Patent
Tate, Jr. et al.

(10) Patent No.: US 8,854,170 B2
(45) Date of Patent: Oct. 7, 2014

(54) SYSTEM AND METHOD OF FILLING AN AIR GAP BETWEEN A PAIR OF CORE SECTIONS OF A TRANSFORMER

(75) Inventors: Edward D. Tate, Jr., Grand Blanc, MI (US); Alan G. Holmes, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 810 days.

(21) Appl. No.: 13/112,014

(22) Filed: May 20, 2011

(65) Prior Publication Data

US 2012/0293116 A1  Nov. 22, 2012

(51) Int. Cl.
| | |
|---|---|
| *H01F 21/06* | (2006.01) |
| *H02J 7/00* | (2006.01) |
| *H02K 17/00* | (2006.01) |
| *H02J 5/00* | (2006.01) |
| *H01F 1/44* | (2006.01) |
| *B60L 11/18* | (2006.01) |
| *H01F 38/14* | (2006.01) |
| *H01F 27/38* | (2006.01) |
| *H02J 7/02* | (2006.01) |
| *H01F 27/40* | (2006.01) |
| *H01F 3/10* | (2006.01) |

(52) U.S. Cl.
CPC .............. *H02J 5/005* (2013.01); *H01F 1/447* (2013.01); *H01F 2027/404* (2013.01); *B60L 11/1829* (2013.01); *H01F 38/14* (2013.01); *H01F 27/38* (2013.01); *H01F 2003/106* (2013.01); *H01F 1/442* (2013.01); *H02J 7/025* (2013.01); *Y02T 10/7088* (2013.01); *Y02T 10/7005* (2013.01); *Y02T 90/16* (2013.01); *Y02T 90/125* (2013.01); *Y02T 90/12* (2013.01); *Y02T 90/14* (2013.01); *Y02T 90/122* (2013.01)
USPC ........................... 336/134; 320/108; 310/166

(58) Field of Classification Search
CPC ............ H02J 5/005; H01F 1/44; H01F 1/447; H01F 2027/404; H01F 38/14; B60L 11/1829
USPC .............. 336/134, 20; 320/108; 310/166, 176
See application file for complete search history.

(56) References Cited

U.S. PATENT DOCUMENTS

| | | | |
|---|---|---|---|
| 3,300,663 A | | 1/1967 | Rosaen |
| 4,894,615 A | * | 1/1990 | Mermelstein ................. 324/244 |
| 6,515,382 B1 | * | 2/2003 | Ullakko .......................... 310/26 |
| 2011/0204845 A1 | * | 8/2011 | Paparo et al. ................. 320/108 |

FOREIGN PATENT DOCUMENTS

DE              150673 A1    9/1989

* cited by examiner

*Primary Examiner* — M'Baye Diao
(74) *Attorney, Agent, or Firm* — Quinn Law Group, PLLC

(57) ABSTRACT

An energy conversion system includes a first core section, a tank, a flexible structure, and an output coil. The tank contains a volume of fluid having a high magnetic permeability. The flexible structure is fluidly coupled to the tank and movable from a retracted to an extended position in response to the injection of the fluid from the tank. The output coil is in electrical communication with the first core section. A charging station includes a second core section and an input coil. The first and second core sections are in alignment to define an air gap therebetween. The air gap is reduced when the flexible structure is in the extended position within the air gap such that the flexible structure transmits magnetic flux between the second core section and the first core section. The magnetic flux in the first core section induces electrical current in the output coil.

22 Claims, 5 Drawing Sheets

SYSTEM AND METHOD OF FILLING AN AIR GAP BETWEEN A PAIR OF CORE SECTIONS OF A TRANSFORMER

TECHNICAL FIELD

The invention generally relates to a system and method for filling an air gap between a pair of core sections of a transformer.

BACKGROUND

Vehicles employ various power sources for propulsion. Such power sources may include an internal combustion engine and/or one or more electric motors or a fuel-cell.

Each power source typically requires an energy storage device configured to receive and store energy, and to supply the stored energy to operate the power source. A specific amount of energy stored within the energy storage device generally operates the vehicle for a finite driving range. When the energy contained within the energy storage device is reduced, the energy storage device will be recharged.

SUMMARY

An electric vehicle includes an energy conversion system that includes a first core section, a tank, a flexible structure, and an output coil. The first core section is configured for alignment with a second core section to define an air gap therebetween. The tank is configured for containing a volume of fluid having a magnetic permeability. The flexible structure is fluidly coupled to the tank and is movable from a retracted position to an extended position in response to the injection of fluid from the tank to the expandable structure such that the air gap is reduced. The flexible structure is configured to transmit magnetic flux between the second core section and the first core section, through the fluid within the expandable structure and or the structure. The output coil is in electrical communication with the first core section. The magnetic flux in the first core section induces electrical current in the output coil.

A charging system includes an energy conversion system and a charging station. The energy conversion system includes a first core section, a tank, a flexible structure, and an output coil. The tank contains a volume of fluid having a high magnetic permeability. The flexible structure is fluidly coupled to the tank and is movable from a retracted position to an extended position in response to the injection of the fluid from the tank to the expandable structure. The output coil is in electrical communication with the first core section. The charging station includes a second core section and an input coil. The second core section is in alignment with the first core section to define an air gap therebetween and to form a transformer. The input coil is in electrical communication with the second core section. The air gap is reduced when the flexible structure is in the extended position within the air gap such that the flexible structure transmits magnetic flux between the second core section and the first core section, through the fluid within the expandable structure. The magnetic flux in the first core section induces electrical current in the output coil.

A method of filling an air gap defined between a pair of core sections of a transformer includes disposing a flexible structure between the pair of core sections. A fluid having a magnetic permeability is injected into the flexible structure to move the flexible structure from a retracted position to an extended position such that the air gap is reduced.

The above features and advantages and other features and advantages of the present invention are readily apparent from the following detailed description of the best modes for carrying out the invention when taken in connection with the accompanying drawings.

DETAILED DESCRIPTION

Figure 1:
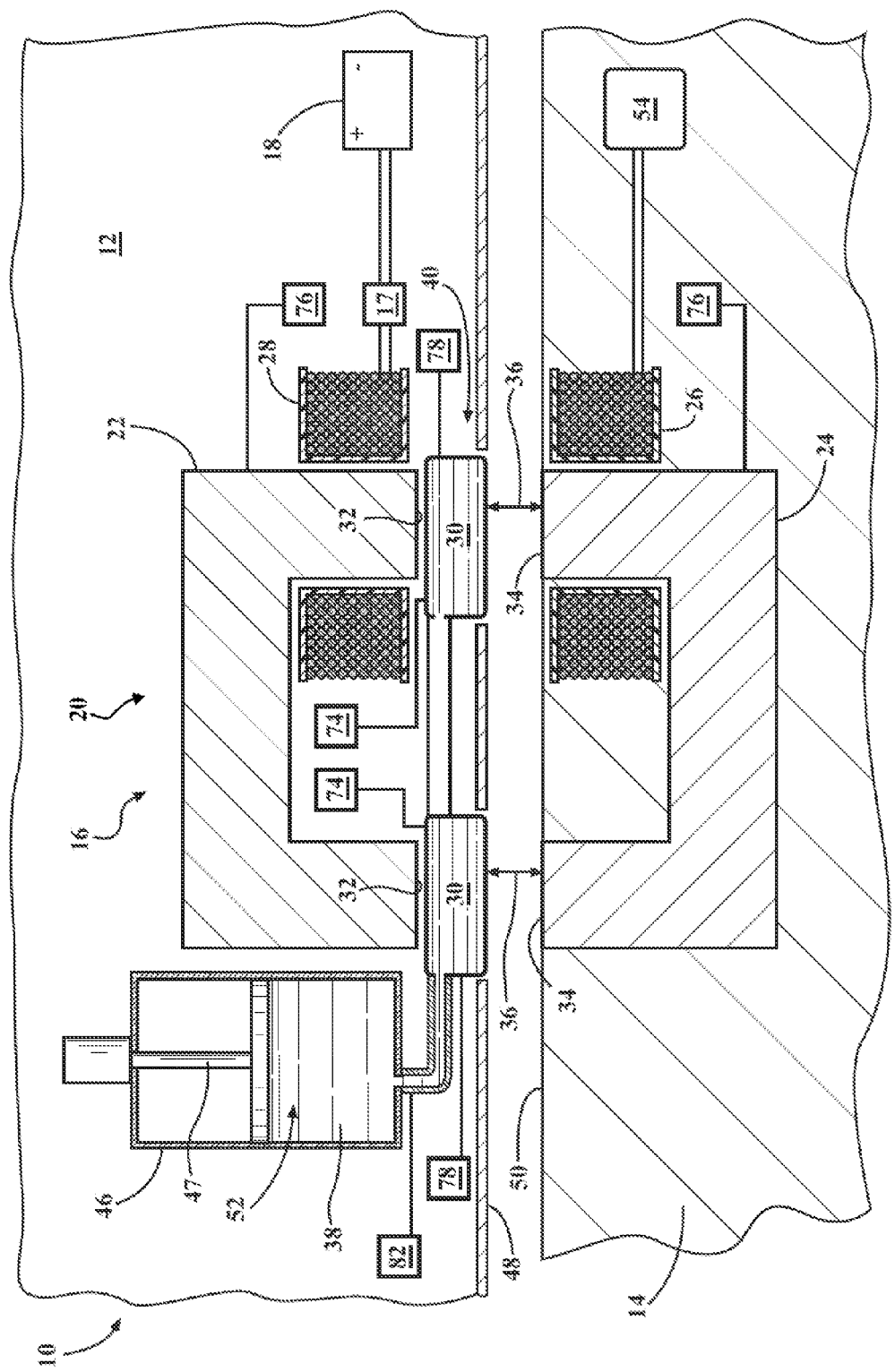
FIG. 1 is a schematic cross sectional side view of a charging system for a vehicle having a pair of core members and a flexible structure in a retracted position.

Referring to the drawings, wherein like reference numbers correspond to like or similar components throughout the several figures, FIG. 1 shows a charging system 10 including an electric vehicle 12. The electric vehicle 12 may be a battery electric vehicle (BEV), an extended-range electric vehicle (EREV), a plug-in hybrid electric vehicle (PHEV), and the like. The charging system 10 includes the electric vehicle 12 and a charging station 14.

The electric vehicle 12 includes an energy conversion system 16 and an energy storage device 18. The energy conversion system 16 is configured to receive electric current transmitted from any of a plurality of the charging stations 14, disposed in various geographical locations. The energy storage device 18 is operatively connected to the energy conversion system 16 and may be an electric energy storage device 18, such as a rechargeable battery and the like that is configured to be electrically charged at one of the charging stations 14 via the energy conversion system 16.

Figure 2:
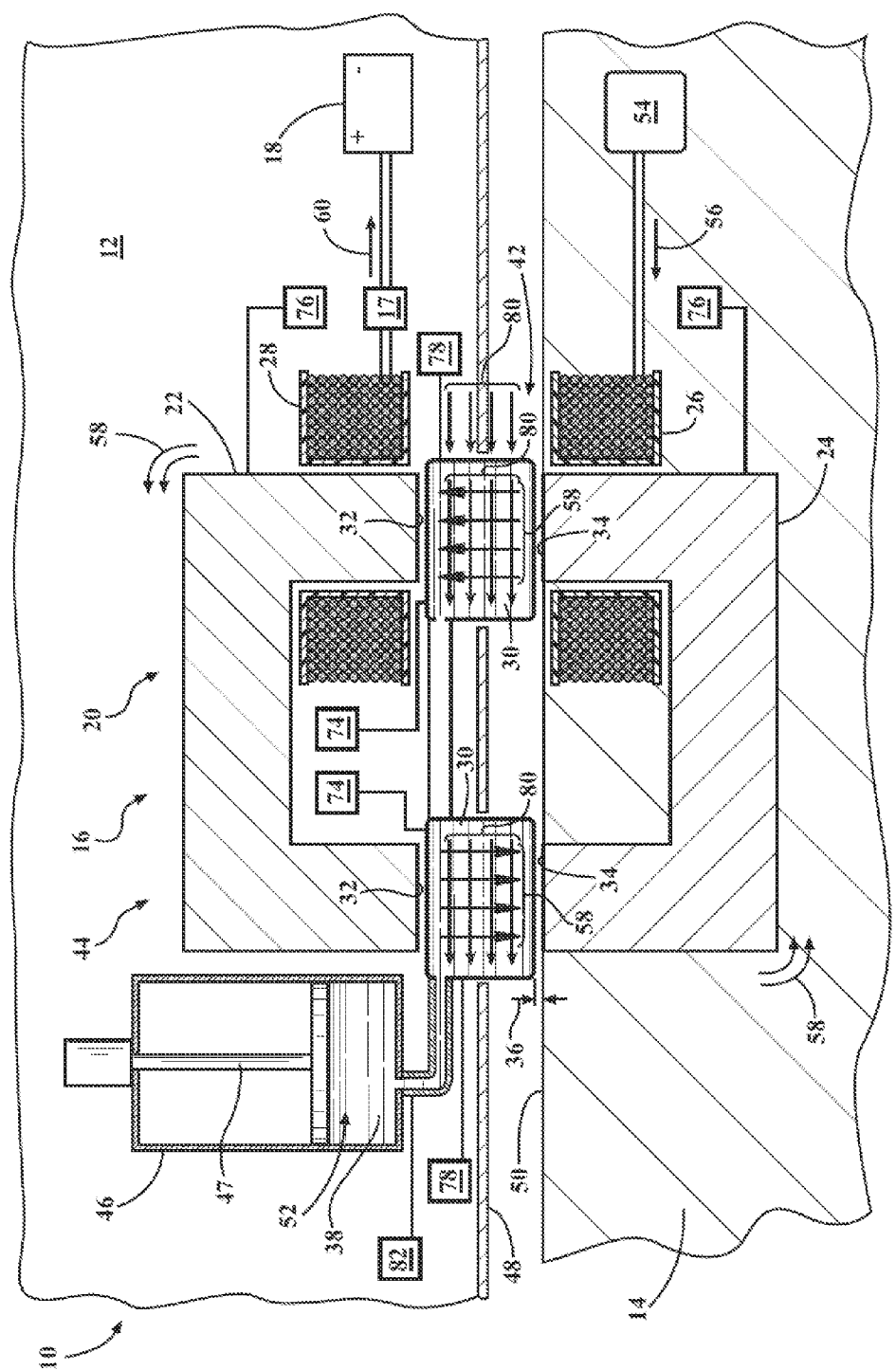
FIG. 2 is a schematic cross sectional side view of the charging system of FIG. 1 with the flexible structure in an extended position.

When the electric vehicle 12 is at one of the charging stations 14, the energy storage device 18 is configured to selectively receive an electric charge from the charging station 14. More specifically, when the energy conversion system 16 of the electric vehicle 12 is mated or otherwise aligned with the charging station 14, the energy conversion system 16 and the charging station 14 cooperate to form a transformer 20 that selectively transfers electric energy from the charging station 14 to the energy storage device 18 within the electric vehicle 12. Once formed, the transformer 20 includes a first core section 22, a second core section 24, an input coil 26, an output coil 28, and a pair of flexible structures 30. Each of the first and second core sections 22, 24 are generally u-shaped objects that extend between a respective pair of ends 32, 34, respectively. When the transformer 20 is formed, the ends 32 of the first core section 22 face or otherwise oppose the respective ends 34 of the second core section 24 such that an air gap 36 is defined between the ends 32, 34 of the first and second coil sections. The flexible structures 30 are operatively disposed within the air gaps 36 defined between the opposing ends of the first and second core sections 22, 24. The flexible structures 30 are configured to be selectively filled with a fluid 38 having a high magnetic permeability to move the flexible structure 30 from a retracted position 40, as shown in FIG. 1, to an extended position 42, as shown in FIG. 2, such that the air gaps 36 are filled. The high magnetic permeability fluid 38 may be configured to prevent or otherwise eliminate flux leakage flowing into/from the ends 32, 34 of the first and second core sections 22, 24 and across the air gap 36. More specifically, the fluid 38 may include an oil and metal material, e.g., iron filings and the like. Once the flexible structure 30 is in the extended position 42 between the opposing ends 32, 34 of the core sections 22, 24, a common core 44 is established, such that the air gaps 36 are reduced or otherwise eliminated.

The input coil 26 surrounds a portion of the second core section 24 and the output coil 28 surrounds a portion of the first core section 22. More specifically, the input and output coil 26, 28 are electrically insulated from one another and wound upon the common core 44 (FIG. 2) that is formed from the first core section 22, the second core section 24, and the extended flexible structures 30. Magnetic coupling is used to transfer electric energy from the input coil 26 to the output coil 28 via the common core 44. The first and second core sections 22, 24 may be formed from magnetic material, e.g., iron, steel, ceramics, and/or other nonmagnetic and magnetic materials.

As discussed above, the transformer 20 is provided by selectively aligning the energy conversion system 16 of the electric vehicle 12 with the charging station 14. The energy conversion system 16 includes the first core section 22, the output coil 28, the flexible structure 30, and a tank 46. As described above, the ends 32 of the first core section 22 are configured for alignment with the corresponding ends 34 of the second core section 24 to define the air gaps 36 between the corresponding ends 32, 34. More specifically, referring to FIGS. 1 and 2, the first core section 22 is disposed in an underbody 48 of the electric vehicle 12 such that the ends 32 of the first core section 22 generally face the ground 50 and/or the charging station 14. The tank 46 is configured for containing a volume 52 of the fluid 38 having the high magnetic permeability. The flexible structures 30 are fluidly coupled to the tank 46 and are configured to move from the retracted position 40 and the extended position 42 in response to the injection of the fluid 38 from the tank 46 to the expandable structures such that the air gaps 36 are reduced. The tank 46 may include, or otherwise be operatively connected to a piston 47, pump, or some other mechanism configured for moving the fluid between the tank 46 and the flexible structures 30. In one embodiment, shown in FIG. 4, a pair of tanks 46 are provided where each tank 46 includes a piston 47 and is fluidly coupled to a respective one of the pair of flexible structures 30. Referring again to FIGS. 1 and 2, the flexible structure 30 may be disposed on each end 32 of the first core section 22 to reduce, fill, or otherwise eliminate the air gaps 36 when moving the flexible structure 30 from the retracted position 40 (FIG. 1) to the extended position 42 (FIG. 2). The flux leakage is reduced or eliminated by reducing and/or filling the air gaps 36 between the first and second core sections 22, 24. The magnetic permeability of the fluid 38 means that that the magnetic field 58 travels through the fluid 38 within the flexible structure 30, between the ends 32, 34 of the core sections 24, 22. If the magnetically permeable fluid 38 did not fill the air gaps 36, the magnetic field 58 would "leak" when travelling between the ends 34, 32 of the core sections 24, 22. Therefore, reducing or otherwise eliminating this leakage by filling or reducing the air gaps 36 improve the charging efficiency of the energy storage device 18. Likewise, the flexible structures 30 are configured to move from the extended position 42 to the retracted position 40 in response to expelling the fluid, i.e., the removal or withdrawal of the fluid 38, from the flexible structure 30, back into the tank 46, in response to activation of the piston 47. More specifically, elasticity of the flexible structures 30 may cause the fluid to be expelled back into the tank 46, especially when the piston 47 is not acting on the fluid to otherwise move the fluid from the tank 46 to the flexible structures 30.

The charging station 14 includes the second core section 24, the input coil 26, and a generator 54. As described above, the ends 34 of the second core section 24 are configured for alignment with the corresponding ends 32 of the first core section 22. The input coil 26 is wound about a portion of the second core section 24 such that a first electrical current 56 traveling through the input coil 26 from the generator 54, in turn, generates a magnetic field 58 that travels through the common core 44. More specifically, the magnetic field 58 travels through the second core section 24, the extended flexible structure 30, and the first core section 22. Since the output coil 28 is wound about a portion of the first core section 22, the magnetic field 58 traveling through the first core section 22, in turn, induces a second electrical current 60 within the output coil 28. The electrical current induced within the output coil 28 then travels to the energy storage device 18. More specifically, the electrical current induced within the output coil 28 may be an alternating current, which travels through a rectifier 17. The rectifier 17 converts the alternating current to a direct current (DC). The direct current then travels from the rectifier 17 to the energy storage device 18.

The electric vehicle 12 is driven to a desired charging station 14 such that the corresponding ends 32, 34 of the first and second core sections 22, 24 become generally aligned with one another to define the air gaps 36 therebetween. The energy conversion system 16 is selectively deployed such that the flexible structures 30, disposed within the air gap 36 between the first and second core sections 22, 24, are injected with the fluid 38 from the tank 46. Upon injection of the fluid 38 into the flexible structures 30, the flexible structures 30 move from the retracted position 40 to the extended position 42 such that the air gap 36 is reduced or eliminated.

Figure 3:
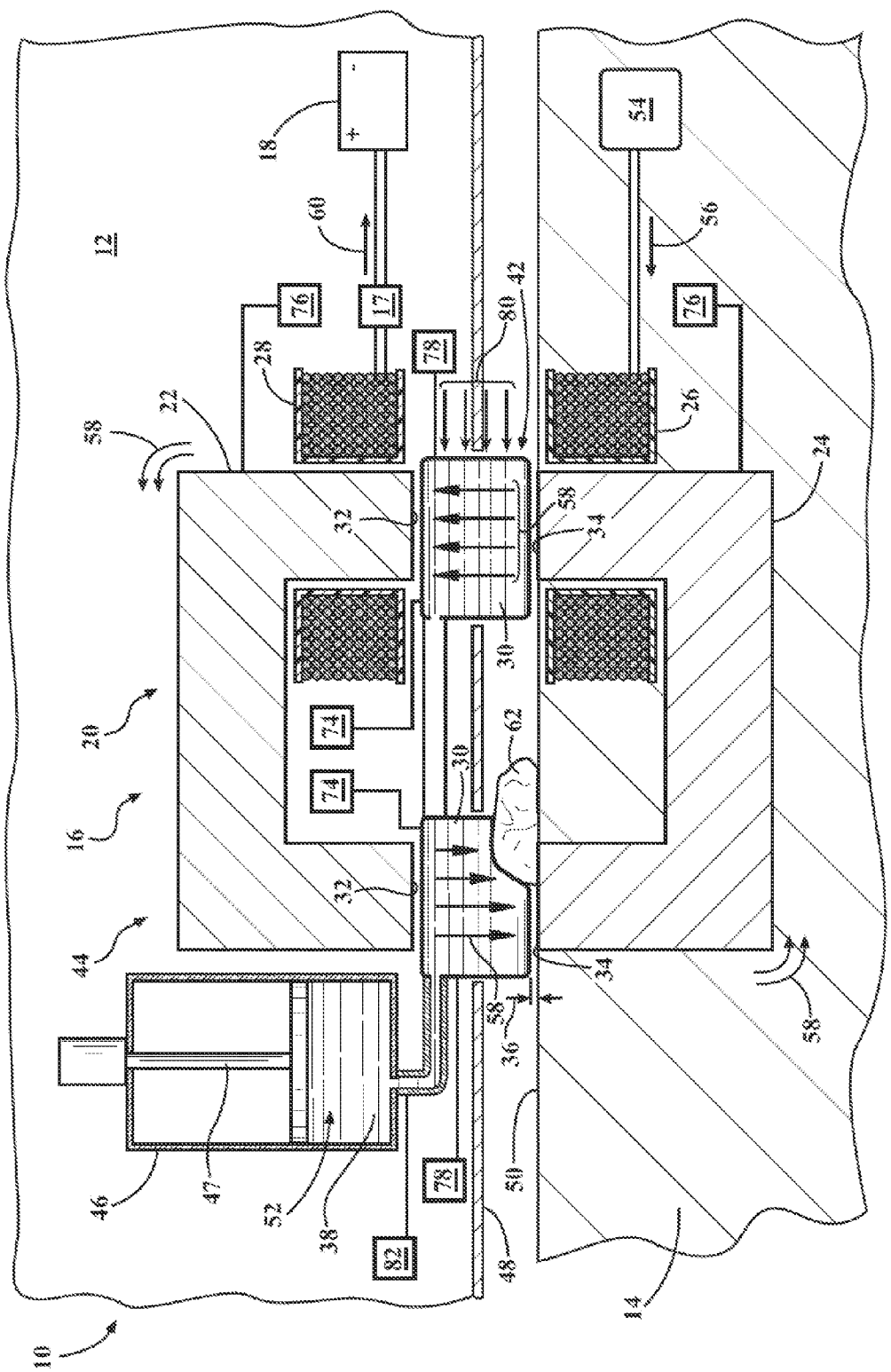
FIG. 3 is a schematic cross sectional side view of the charging system of FIG. 2 with the flexible structure in the extended position, while conforming to a piece of debris on one of the pair of core members.
Figure 4:
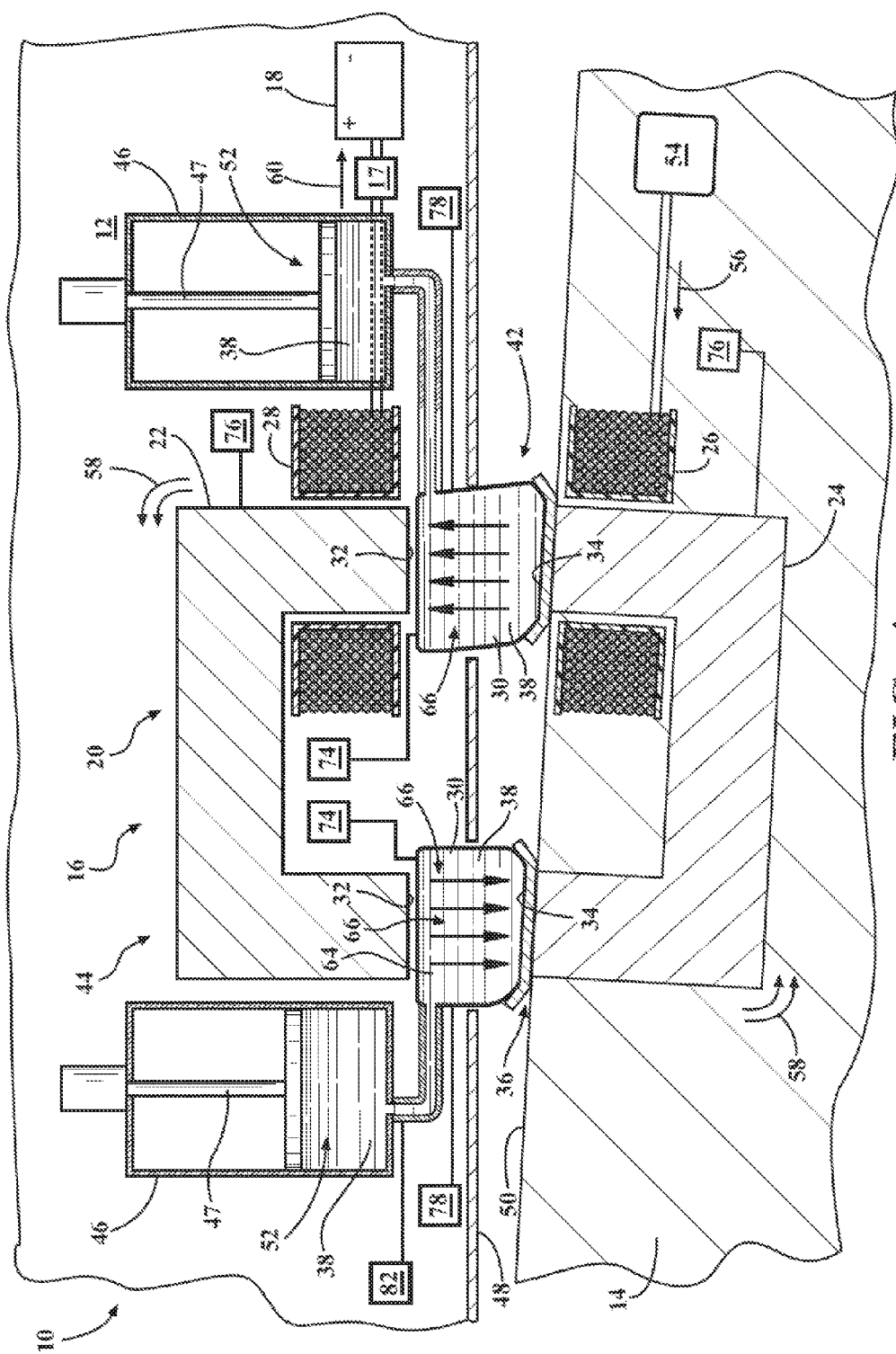
FIG. 4 is a schematic cross sectional side view of another embodiment of the charging system of FIG. 2 with the flexible structure in the extended position and configured to adapt to misalignment between the pair of core members.

The flexible structures 30 may be configured to adapt to any misalignment that occurs between the corresponding ends 32, 34 of the first and second core sections 22, 24. Additionally, the flexible structures 30 may be flexible enough to conform to any debris 62 present on one or both ends 34 of the second core section 24, as illustrated in FIG. 3. In one embodiment, as shown in FIG. 4, each flexible structure 30 is separated into a plurality of chambers 64. Each chamber 64 defines a respective volume 66 such that each chamber 64 inflates independently as a result of the injection of the fluid 38 from the tank 46. By allowing the chambers 64 to inflate separately, some chambers 64 may be able to grow larger than other chambers 64 to adapt to fill the air gaps 36 that are non-uniform in shape as a result of misalignment between the energy conversion system 16 of the electric vehicle 12 and the charging station 14.

Figure 5:
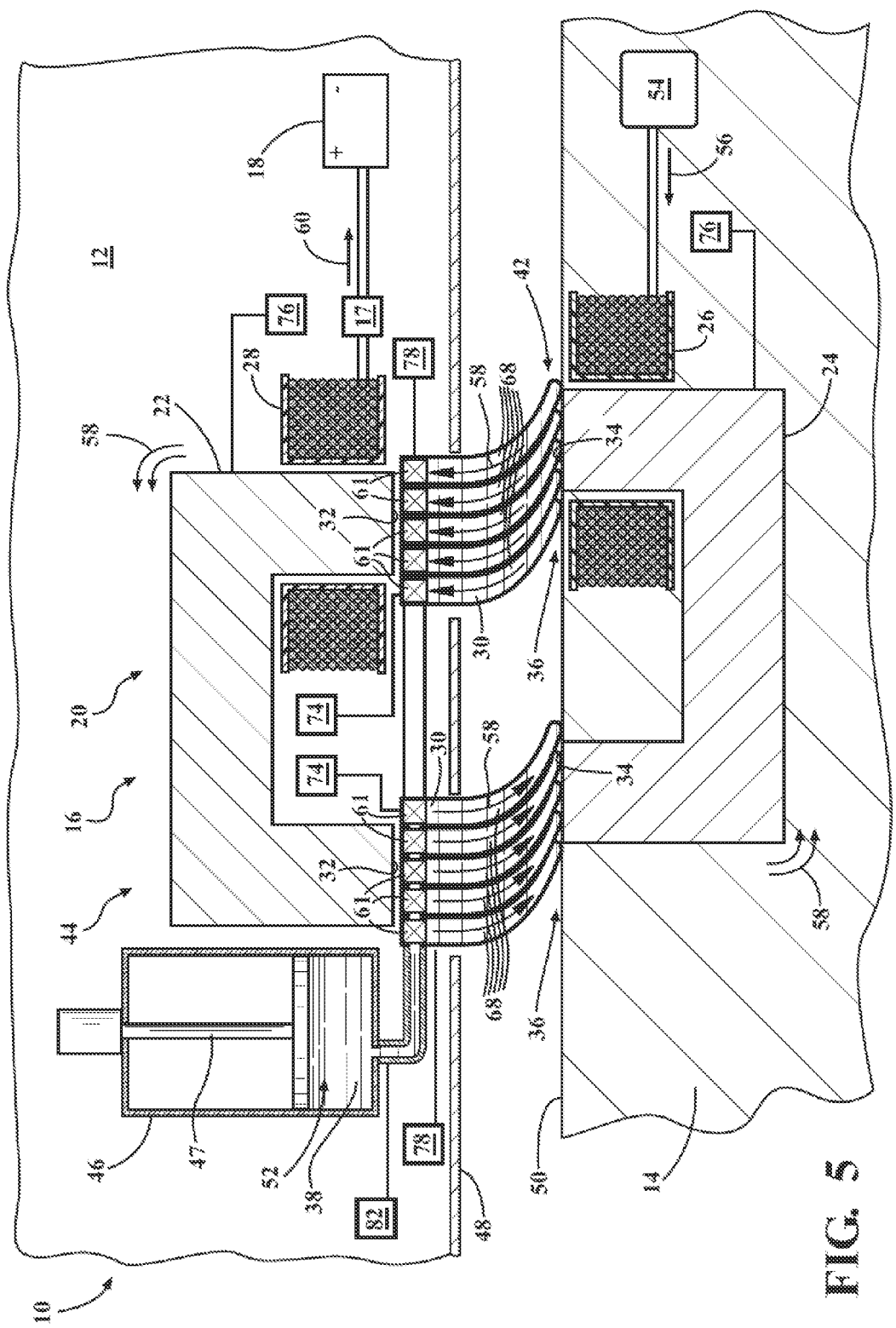
FIG. 5 is a schematic cross sectional side view of yet another embodiment of the charging system of FIG. 2 with the flexible structure in the extended position and configured to adapt to misalignment between the pair of core member.

Referring to FIG. 5, in another embodiment, each flexible structure 30 has a curved or bent shape when in the extended position 42. The flexible structures 30 are formed from a plurality of cells 68 that are each configured to curve or bend when the flexible structure 30 is in the extended position 42. Bending or curving the cells 68 may allow the flexible structure 30 to adapt to misalignment between the corresponding ends 32, 34 of the first and second core sections 22, 24. Each cell 68 includes a respective valve 61 which is controllable to regulate the amount of fluid that fills the respective cell 68 of the flexible structure 30. Therefore, each cell 68 is configured to receive a different volume of fluid 38, through the respective valve 61, which may be different in volume from one or more of the other cells 68. This difference in the volume of fluid 38 in each of the cells 68 means that the flexible structure 30 may provide differential pressure in each cell 68, which allows the bending and/or other kinematic behavior of the flexible structure 30 upon moving to the extended position 42. The differential pressure in each cell 68 also allows the amount of the curvature or bending of the flexible structure 30 to be controlled, as desired. Likewise, the flexible structures 30 may have elastic properties such that when the valves 61 to the cells 68 are open and the piston 47 is not acting on the fluid to move the fluid from the tank 46 to the cells 68, the elasticity of the flexible structure 30 may act on the fluid to expel the fluid from the cells 68 of the flexible structure 30, back into the tank 46.

The ends 34 of the second core section 24 may include passive or mechanical alignment features 70, as shown in FIG. 4. More specifically, the alignment features 70 extend from each end 34 of the second core section 24. Each alignment feature 70 is generally u-shaped to define a channel 72 therein. The channel 72 of each alignment feature 70 opens to, or is otherwise part of, the respective air gap 36. Each channel 72 is configured to receive and capture a portion of the corresponding expandable structure when the expandable structures are in the extended position 42.

Referring again to FIGS. 1 and 2, a pressure sensor 74 may be disposed in communication with one or both of the flexible structures 30 in order to determine whether the air gap 36 has been sufficiently reduced or eliminated. The pressure sensor 74 is configured to monitor and determine the pressure inside of one or both flexible structures 30. Accordingly, the extended position 42 is achieved when the detected pressure inside of the flexible structure 30 is at a first pressure limit. Another way to determine that the air gap 36 has been sufficiently reduced or eliminated is by detecting a volume of the fluid 38 that has been injected from the tank 46 into the flexible structures 30. A flow meter 82 may be operatively attached between the tank 46 and one or both flexible structures 30 to measure the volume of the fluid 38 flowing into or out of the flexible structures 30. Therefore, the extended position 42 is achieved when the detected volume of the fluid 38 inside of the flexible structures 30 is at a first volume limit. Yet another way to determine when the air gap 36 has been sufficiently reduced or eliminated may be achieved by measuring an impedance value across the first and second core sections 22, 24. By way of a non-limiting example, an ohmmeter 76 is operatively connected across the first and second core sections 22, 24 to detect the impedance value. Thus, the extended position 42 is achieved when the detected impedance value is at or below a first impedance limit.

As discussed above, the fluid 38 is configured to have a high magnetic permeability. By way of a non-limiting example, the fluid 38 includes an oil and metallic material, e.g., iron filings, and the like. The fluid 38 may also be configured to thicken or otherwise harden when exposed to a biasing field. Therefore, in order to further reduce flux leakage and/or to ensure that the air gap 36 has been sufficiently reduced or eliminated, a biasing field 80 may be applied to the fluid 38 inside the flexible structure 30 using an electric field generator 78 such that the fluid 38 solidifies. The biasing field may be a DC biasing field 80.

While the best modes for carrying out the invention have been described in detail, those familiar with the art to which this invention relates will recognize various alternative designs and embodiments for practicing the invention within the scope of the appended claims.

The invention claimed is:

1. An electric vehicle comprising an energy conversion system, wherein the energy conversion system includes:
   a first core section configured for alignment with a second core section to define an air gap therebetween and to form a transformer;
   a tank configured for containing a volume of fluid having a magnetic permeability;
   a flexible structure fluidly coupled to the tank and movable from a retracted position to an extended position in response to the injection of fluid from the tank into the expandable structure such that the air gap is reduced, wherein the flexible structure is configured to transmit magnetic flux between the second core section and the first core section, through the fluid within the expandable structure; and
   an output coil in electrical communication with the first core section, wherein the magnetic flux in the first core section induces electrical current in the output coil.

2. An electric vehicle, as set forth in claim 1, wherein the first core section extends between a pair of ends configured for alignment with the second core section extending between a pair of ends, opposing the pair of ends of the first core section, to define an air gap between each of the corresponding pair of ends.

3. An electric vehicle, as set forth in claim 2, wherein the flexible structure is a pair of flexible structures fluidly coupled to the tank and movable from a retracted position to an extended position in response to the injection of fluid from the tank into the pair of flexible structures such that the air gaps are reduced.

4. An electric vehicle, as set forth in claim 3, wherein the tank is a pair of tanks and each tank is fluidly coupled to a respective one of the pair of flexible structures.

5. An electric vehicle, as set forth in claim 1, wherein the flexible structure is separated into a plurality of chambers, wherein each chamber defines a respective volume such that each chamber inflates to the extended position independently from one another as a result of the injection of the fluid from the tank.

6. An electric vehicle, as set forth in claim 1, wherein the flexible structure is selectively curved when in the extended position.

7. An electric vehicle, as set forth in claim 6, wherein the flexible structure includes a plurality of cells that are each selectively curved, by the application of a differential volume of fluid to each of the cells, when the flexible structure is in the extended position.

8. An electric vehicle, as set forth in claim 7, wherein the flexible structure includes a plurality of valves in fluid communication with a respective one of the plurality of cells;
   wherein each of the plurality of valves is configured to regulate the flow of fluid into the respective one of the plurality of cells.

9. An electric vehicle, as set forth in claim 1, wherein the flexible structure is movable from the extended position to the retracted position in response to expelling the fluid from the expandable structure and into the tank such that the air gap is increased.

10. A charging system comprising:
   an energy conversion system including:
      a first core section;
      a tank containing a volume of fluid having a high magnetic permeability;

a flexible structure fluidly coupled to the tank and movable from a retracted position to an extended position in response to the injection of fluid from the tank into the expandable structure;

an output coil in electrical communication with the first core section; and a charging station including:

a second core section in alignment with the first core section to define an air gap therebetween and to form a transformer;

an input coil in electrical communication with the second core section;

wherein the air gap is reduced when the flexible structure is in the extended position within the air gap such that the flexible structure transmits magnetic flux between the second core section and the first core section, through the fluid within the expandable structure; and wherein the magnetic flux in the first core section induces electrical current in the output coil.

11. A charging system, as set forth in claim 10, wherein the first core section and the second core section each extend between a pair of ends such that the pair of ends of the first core section oppose the pair of ends of the second core section to define an air gap between each of the corresponding pair of ends.

12. An charging system, as set forth in claim 11, wherein the flexible structure is a pair of flexible structures disposed in a respective one of the pair of air gaps and fluidly coupled to the tank and movable from a retracted position to an extended; and wherein the pair of flexible structures are fluidly coupled to the tank and movable from a retracted position to the extended position in response to the injection of fluid from the tank to the pair of flexible structures such that the air gaps are reduced.

13. A charging system, as set forth in claim 12, wherein the tank is a pair of tanks and each of the pair of tanks is fluidly coupled to a respective one of the pair of flexible structures.

14. A charging system, as set forth in claim 10, wherein the flexible structure is separated into a plurality of chambers, wherein each chamber defines a respective volume such that each chamber inflates to the extended position independently from one another as a result of the injection of the fluid from the tank.

15. A charging system, as set forth in claim 10, wherein the flexible structure is curved when in the extended position.

16. A charging system, as set forth in claim 15, wherein the flexible structure includes a plurality of cells that are each curved when the flexible structure is in the extended position.

17. A method of filling an air gap defined between a pair of core sections of a transformer, the method comprising:

disposing a flexible structure between the pair of core sections;

injecting a fluid having a magnetic permeability into the flexible structure to move the flexible structure from a retracted position to an extended position such that the air gap is reduced.

18. A method, as set forth in claim 17, further comprising expelling the fluid from the flexible structure to move the flexible structure from the extended position to the retracted position such that the air gap is increased.

19. A method, as set forth in claim 17, further comprising detecting a pressure in the flexible structure; and wherein the extended position is achieved when the detected pressure inside of the flexible structure is at a first pressure limit.

20. A method, as set forth in claim 17, further comprising detecting a volume of the fluid injected into the flexible structure;

wherein the extended position is achieved when the detected volume of the fluid inside of the flexible structure is at a first volume limit.

21. A method, as set forth in claim 17, further comprising detecting an impedance value across the pair of core sections and the flexible structure;

wherein the extended position is achieved when the detected impedance is at or below a first impedance limit.

22. A method, as set forth in claim 17, further comprising applying a biasing field to the fluid such that the fluid solidifies.

* * * * *